United States Patent

Sobrinho

(10) Patent No.: US 6,630,980 B2
(45) Date of Patent: Oct. 7, 2003

(54) TRANSPARENT FLEXIBLE BARRIER FOR LIQUID CRYSTAL DISPLAY DEVICES AND METHOD OF MAKING THE SAME

(75) Inventor: Argemiro Soares DaSilva Sobrinho, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 256 days.

(21) Appl. No.: 09/836,657

(22) Filed: Apr. 17, 2001

(65) Prior Publication Data

US 2002/0180924 A1 Dec. 5, 2002

(51) Int. Cl.[7] ............................................. G02F 1/13
(52) U.S. Cl. .................................................. 349/158
(58) Field of Search ................................. 344/113, 158

(56) References Cited

U.S. PATENT DOCUMENTS

| | | | | |
|---|---|---|---|---|
| 4,106,859 A | * | 8/1978 | Doriguzzi et al. | 349/113 |
| 4,431,272 A | * | 2/1984 | Yazawa et al. | 349/113 |
| 4,456,336 A | * | 6/1984 | Chung et al. | 349/160 |
| 4,904,060 A | * | 2/1990 | Grupp | 349/162 |
| 5,550,658 A | * | 8/1996 | Yoshihiro | 349/62 |
| 5,724,111 A | * | 3/1998 | Mizobata et al. | 349/112 |
| 5,940,154 A | * | 8/1999 | Ukita et al. | 349/113 |
| 6,130,736 A | * | 10/2000 | Sasaki et al. | 349/122 |
| 6,522,374 B1 | * | 2/2003 | Shie et al. | 349/113 |

OTHER PUBLICATIONS

AS da Silva Sobrinho et al, "A Study of Defects in Ultra–Thin Transparent Coatings on Polymers", Applied Physics A, Materials Science & Processing, 68, pp. 103–105, 1999.

AS da Silva Sobrinho et al, "A Study of Defects in Ultra–Thin Transparent Coatings on Polymers", Surface & Coatings Technology, 116–119, pp. 1204–1210, 1999.

AS da Silva Sobrinho et al, "Defects–Permeation Correlation for Ultrathin Transparent Barrier Coatings on Polymers", J. Vac. Sci. Technol. A 18(1), American Vacuum Society, pp 149–157, 2000.

AS da Silva Sobrinho et al, "Plasma–Deposited Silicon Oxide and Silicon Nitride Films on Poly(ethylene terephthalate): A Multitechnique Study of the Interphase Regions", J. Vac. Sci. Technol. A 16(4), American Vacuum Society, pp 2021–2030, 1998.

AS da Silva Sobrinho et al, "Transparent Barrier Coatings on Polyethylene Terephthalate By Single– and Dual–Frequency Plasma–Enhanced Chemical Vapor Deposition", J. Vac. Sci. Technol. A 16(6), American Vacuum Society, pp 3190–3198, 1998.

AS da Silva Sobrinho et al, "Plasma–Deposited Silicon Oxide and Silicon Nitride Films on Poly(ethylene terephthalate): A Multitechnique Study of the Interphase Regions", pp. 60–208, 1998.

\* cited by examiner

*Primary Examiner*—James Dudek
(74) *Attorney, Agent, or Firm*—Robert P. Santandrea; Patrick K. Patnode

(57) ABSTRACT

A flexible liquid crystal display comprising two plates that are substantially parallel to each other. Each of the plates includes a polymeric substrate having a roughness of up to about 5 nm, a barrier coating disposed on a surface of the polymeric substrate, and a transparent conductive layer disposed on a surface of the barrier coating opposite the polymeric substrate. A liquid crystal material is interposed between the two plates, such that the liquid crystal material contacts the transparent conductive layer on each of the two plates. The invention also includes a barrier coated polymer sheet for use in a liquid crystal display having a polycarbonate substrate with a roughness up to about 5 nm and a barrier coating, such as silicon nitride or silicon oxide, having a density of at least 1.8 g/cc disposed on a surface of the polycarbonate substrate. A method of making the barrier coated polymer sheet is also described.

39 Claims, 3 Drawing Sheets

TRANSPARENT FLEXIBLE BARRIER FOR LIQUID CRYSTAL DISPLAY DEVICES AND METHOD OF MAKING THE SAME

BACKGROUND OF THE INVENTION

The present invention relates generally to a transparent flexible barrier and, more particularly, to a transparent flexible barrier for liquid crystal display devices and methods of making the same.

Active-matrix liquid-crystal displays (LCDs) are widely used as displays for different applications and are the standard on high-end laptop computers. In a liquid crystal display the liquid crystal is held between two glass plates. These plates are usually manufactured with transparent electrodes, typically made of indium tin oxide (ITO) that make it possible to apply an electric field across small areas of the liquid crystal film. The outer surfaces of these plates are coated with filters to polarize the light entering and leaving the crystal. Usually these filters are crossed, which means that, normally, no light would be able to pass through the display. The liquid crystal, however, will modify the polarization of the light in some way that is dependent on the electric field being applied to it. Therefore, it is possible to dynamically create regions where light passes through and other regions where it does not.

The attractive design opportunities offered by flat and flexible displays as well as their low-cost manufacturing potential have led to significant interest in plastic-based liquid crystal displays.

However, many liquid crystal materials undergo detrimental reactions with oxygen and moisture. To function over extended periods of time the LCD devices must be sealed to prevent contact of the liquid crystal material with water and oxygen. Whereas this does not pose a problem when impermeable glass plates are used, it is a major concern in the case of flexible LCD displays that employ flexible polymeric substrates.

In order to have a LCD display with a lifetime of 10 years or greater, the water vapor and oxygen permeation rate through the polymeric substrate used should be about $\leq 1$ g/m$^2$-day and about $\leq 0.1$ cm$^3$/m$^2$-day, respectively. None of the currently available polymeric substrates are able to meet the stringent permeability barrier requirements that are necessary for use as a substrate for LCD devices. In order to provide these properties, the polymeric substrate must therefore receive some type of treatment to sufficiently reduce the permeability of the LCD to both water and oxygen.

Accordingly, there is a need in the art for an improved polymeric-based transparent flexible material for use with liquid crystal display devices.

SUMMARY OF THE INVENTION

This invention meets this and other needs by providing a flexible liquid crystal display that includes a water and oxygen permeability barrier that is deposited on a polymeric substrate, a barrier coated polymeric sheet for use in such liquid crystal displays, a method of making such a barrier coated polymeric sheet, and an apparatus for coating a continuous sheet of polymeric substrate with a barrier layer.

Accordingly, one aspect of the present invention is to provide a flexible liquid crystal display. The flexible liquid crystal display comprises two plates that are substantially parallel to each other, wherein each of the plates comprises: a polymeric substrate having a surface roughness of up to about 5 nm; a barrier coating disposed on a surface of the polymeric substrate; and a transparent conductive layer disposed on a surface of the barrier coating opposite the polymeric substrate. The flexible liquid crystal display also comprises a liquid crystal material disposed between the two plates, such that the liquid crystal material contacts the transparent conductive layer on each of the two plates.

A second aspect of the invention is to provide a barrier coated polymer sheet for use in a liquid crystal display. The barrier coated polymer sheet comprises a polycarbonate substrate having a surface roughness of up to about 5 nm; and a barrier coating disposed on a surface of the polycarbonate substrate, wherein the barrier coating has a density of at least 1.8 g/cm$^3$.

A third aspect of the invention is to provide a flexible liquid crystal display. The flexible liquid crystal display comprises two plates that are substantially parallel to each other, wherein each of the plates comprises: a polycarbonate substrate having a surface roughness of up to about 5 nm; a barrier coating disposed on a surface of the polycarbonate substrate; and a transparent conductive layer disposed on a surface of the barrier coating opposite the polycarbonate substrate. The flexible liquid crystal display also comprises a liquid crystal material disposed between the two plates, such that the liquid crystal material contacts the transparent conductive layer on each of the two plates. Each of the plates has an oxygen permeation rate of no greater than about 0.1 cm$^3$ m$^2$-day and a water vapor transmission rate of no greater than about 1.0 g/m$^2$-day.

A fourth aspect of the invention is to provide a method of making a barrier coated polymer sheet for use in a liquid crystal display. The barrier coated polymer sheet comprises a polycarbonate substrate having a surface roughness of up to about 5 nm and a barrier coating disposed on a surface of the polycarbonate substrate, wherein the barrier coating has a density of at least 1.8 g/cm$^3$. The method comprises the steps of: providing the polycarbonate substrate; and depositing the barrier coating on the surface of the polycarbonate substrate by plasma enhanced chemical vapor deposition.

Finally, a fifth aspect of the invention is to provide an apparatus for coating a continuous sheet of polymeric substrate with a barrier layer. The apparatus comprises: a rotatable drum contacting a first surface of the sheet, wherein the rotatable drum and sheet are heatable to a predetermined temperature; a substrate supply for supplying a continuous feed of the sheet to the rotatable drum; at least one deposition device for depositing the barrier layer, the barrier layer comprising at least one of silicon nitride, silicon oxide, aluminum oxide, and combinations thereof on a second surface of the sheet; a sheet collection device for collecting the sheet after the sheet has contacted the rotatable drum and the barrier layer has been deposited on the sheet; and a vacuum chamber for maintaining the rotatable drum, substrate supply, deposition device, and sheet collection device at a predetermined pressure, the vacuum chamber enclosing the rotatable drum, substrate supply, deposition device, and sheet collection device, wherein the vacuum chamber is in communication with a pumping system.

These and other aspects, advantages, and salient features of the present invention will become apparent from the following detailed description, the accompanying drawings, and the appended claims.

DETAILED DESCRIPTION OF THE INVENTION

Figure 1:
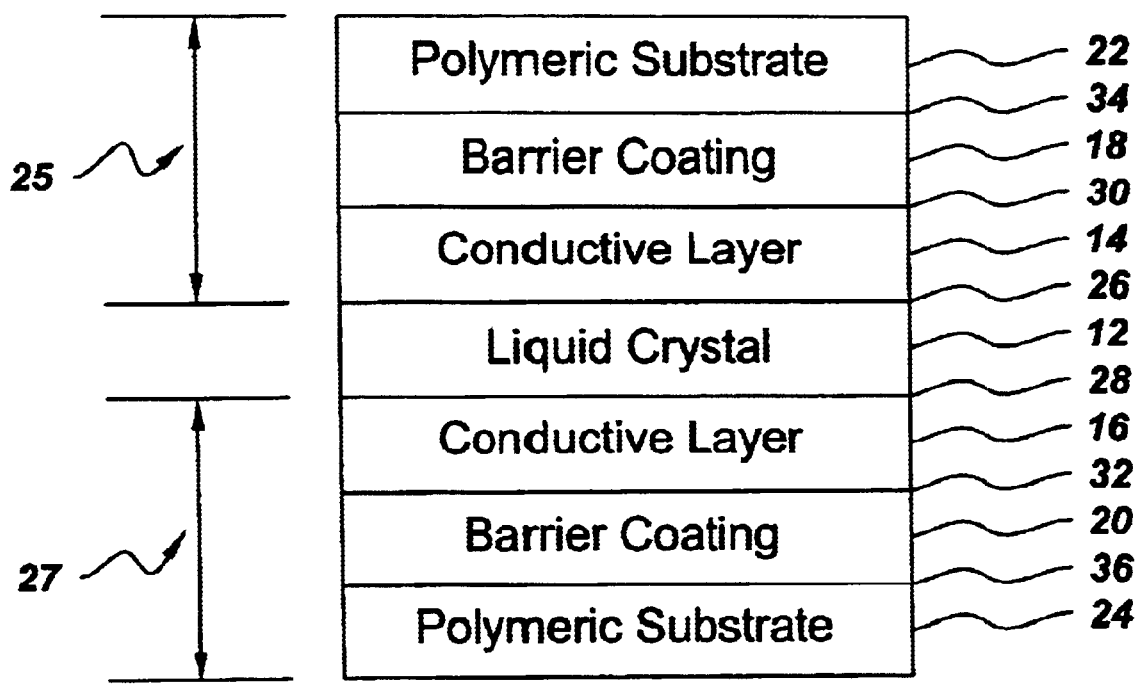
FIG. 1 is a schematic representation of a flexible liquid crystal display in accordance with one embodiment of the instant invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. As can be seen in FIG. 1, a flexible liquid crystal display 10 comprises a center liquid crystal layer 12, a first and a second conductive layer 14, 16, a first and a second barrier coating layer 18, 20 and a first and a second polymeric substrate 22, 24. First polymeric substrate 22, first conductive layer 14 and first barrier coating 18 combine to form a first plate 25 and second polymeric substrate 24, second conductive layer 16 and second barrier coating 20 combine to form a second plate 27. First and second plates 25, 27 are disposed substantially parallel to one another and liquid crystal layer 12 is interposed therebetween.

In a preferred embodiment, first plate 25 and second plate 27 have an oxygen permeation rate of no greater than about 0.1 cm$^3$/m$^2$-day and a water vapor transmission rate of no greater than about 1.0 g/m 2-day. Additionally, first and second plates 25, 27 are typically substantially transparent, having a transparency of at least 80% in the visible light region of the spectrum.

Liquid crystal layer 12 is typically comprised of nematic liquid crystals (NLCs), thermochromic liquid crystals (TLCs), liotropic liquid crystals (LLCs), ferroelectric liquid crystals (FLCs), twisted nematic liquid crystals (TNLCs), super-twisted nematic liquid crystals (STNLCs), polymer-dispersed liquid crystals (PDLCs), or the like.

First conductive layer 14 contacts a first surface 26 of liquid crystal 12 and second conductive layer 16 contacts an opposite second surface 28 of liquid crystal 12. Each of the conductive layers 14, 16 has a sheet resistance of less than about 30 Ω per square. Conductive layers 14, 16 should be made of a transparent conductive oxide, typically made of a class II or class III oxide. Preferably, conductive layers 14, 16 comprise indium tin oxide (ITO). Alternatively, conductive layers 14, 16 may comprise at least one of tin oxides, cadmium oxides, indium oxides, magnesium oxides, gallium oxides, zinc oxides, germanium oxides, and combinations thereof. The oxides that may be used in conductive layers 14, 16 include, but at not limited to: $(Ga,In)_2O_3$; $CdSn_2O_4$; $CdGa_2O_4$; $CdInO_4$; $CdSb_2O_6$; $CdGeO_4$; $In_2O_3$, $MgIn_2O_3$; $MgIn_2O_4$; ZnO; $ZnSnO_3$; $Zn_2SnO_4$; $Zn_2InO_5$; and $ZnIn_2O_6$. The oxides may also contain small amounts of at least one dopant. For example, $(Ga,In)_2O_3$ may be doped with either Sn or Ge, $In_2O_3$ may be doped with Ga, and ZnO may be doped with either aluminum or gallium. Alternatively, conductive layers 14, 16 may comprise thin transparent metallic films of at least one of Al, Cu, Pt, Pd, and alloys thereof.

In one embodiment, conductive layers 14, 16 have a thickness in the range between about 20 nm to about 200 nm. Typically, conductive layers 14, 16 are deposited using, for example, sputtering, evaporation, ion beam assisted deposition (IBAD), plasma enhanced chemical vapor deposition (PEVCD), or combinations thereof.

First barrier coating 18 is disposed on a surface 34 of polymeric substrate 22. First conductive layer 14 is disposed on a surface 30 of first barrier coating 18 opposite polymeric substrate 22. Similarly, second barrier coating 20 is disposed on a surface 36 of polymeric substrate 24. Second conductive layer 16 is disposed on a surface 32 of second barrier coating 20 opposite polymeric substrate 24. Liquid crystal material 12 is disposed between first plate 25 and second plate 27, such that it contacts surfaces 26, 28 of conductive layers 14, 16, respectively. Barrier coatings 18, 20 can be deposited using, for example, sputtering, evaporation, PEVCD or IBAD, as discussed in greater detail below. Barrier coatings 18, 20 typically have a density (ρ) of at least about 1.8 g/cm$^3$. Silicon Nitride ($Si_3N_4$), Silicon Oxide ($SiO_2$), Aluminum Oxide ($Al_2O_3$), combinations thereof, and the like can be used as barrier coating layers 18, 20. Barrier coatings 18, 20 each typically have a thickness in the range between about 10 nm to about 1000 nm.

In one embodiment, polymeric substrates 22, 24 are polycarbonate substrates. Polymeric substrates 22, 24 typically have a surface roughness ($R_q$) of up to about 5 nm, a thickness in the range between about 12 μm to about 3 mm, and a glass transition temperature ($T_g$) of at least about 150° C. In order to achieve the desired level of surface roughness, polymeric substrates 22, 24 may be fabricated in a clean room, for example a class 1000 clean room. In a preferred embodiment, polymeric substrates 22, 24 have a $T_g$ of greater than about 250° C.

Figure 2:
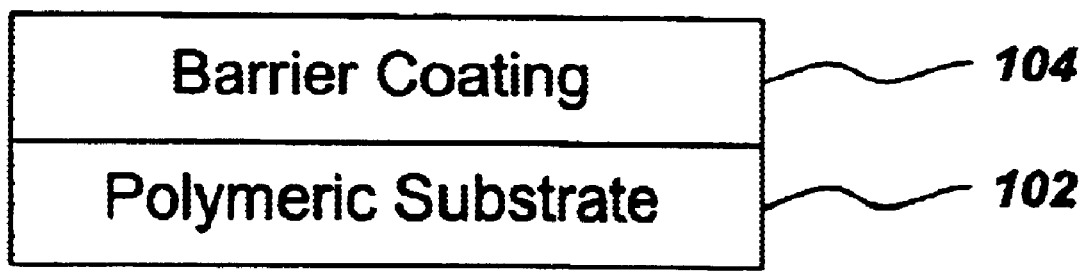
FIG. 2 is a schematic representation of a barrier coated polymer sheet in accordance with one embodiment of the instant invention.

In a preferred embodiment shown in FIG. 2, a barrier-coated polymer sheet 100 comprises a polymeric substrate 102, for example a polycarbonate substrate, and a barrier coating 104 disposed on at least one surface of polymeric substrate 102. A polymeric substrate 102 has a surface roughness of up to about 5 nm and barrier coating 104 has a density of at least about 1.8 g/cm$^3$. This combination of a smooth polymeric substrate 102 and a high-density barrier coating 104, the latter comprising, for example, silicon nitride ($Si_3N_4$), silicon oxide ($SiO_2$), combinations of silicon oxide and silicon nitride ($SiO_xN_y$), or aluminum oxide ($Al_2O_3$), results in a transparent, flexible barrier-coated polymer sheet 100. Barrier-coated polymer sheet 100 can be used in many applications, including, but not limited to, use as a permeability barrier for liquid crystal display devices. The water vapor transmission rate (WVTR) of less than 1 g/m$^2$-day and the oxygen transmission rate (OTR) of less than 0.1 cm$^3$/m$^2$-day makes barrier-coated polymer sheet 100 particularly attractive as a transparent, flexible permeability barrier for liquid crystal display devices.

In one embodiment, barrier coating 104 is a high-density silicon nitride ($Si_3N_4$) layer disposed on one or both sides of polymeric substrate 102, depending upon the polymer surface roughness of each side of the substrate. If the polymeric substrate 102 possesses a very smooth surface, depositing a $Si_3N_4$ coating on only one side of polymeric substrate 102 is sufficient to provide the desired gas (OTR) and moisture barrier (WVTR) properties described above. Typically, the technique used to deposit the silicon nitride coatings is plasma enhanced chemical vapor deposition (PECVD).

PECVD has been largely used in the microelectronics industry to deposit high-density, substantially defect-free $SiO_2$ and $Si_3N_4$ used as dielectric or diffusion barrier materials. At temperatures close to room temperature, these dense coatings permit negligible permeation of different gases, providing the coatings are substantially defect-free. Previous applications have shown that the gas and water vapor permeation rate in plasma coated PET films is mainly controlled by the number of defects (pinholes) in the coating and decreases when the defect density decreases. The main sources for these defects are the surface roughness of the polymer and the presence of dust particles that have become physically bonded to the polymer surface prior to the deposition process. The number of defects decreases with the decrease of polymer surface roughness.

Capacitatively coupled RF plasma is characterized by a high negative DC bias potential, $V_b$, at a powered electrode that controls the flux and the mean energy of ions impinging on a cathode surface. In PECVD, energetic ion bombardment can play the same role as elevated substrate temperature, $T_s$; namely to provide high-quality, dense barrier coatings 18, 20, 104 on the surface of the polymeric substrates 22, 24, 102 respectively. This feature is particularly important when $T_s$ must be kept at a low value; for example, during the deposition of polymeric substrates 22, 24, 102.

The ion bombardment caused by the RF plasma during the deposition process further decreases polymeric substrate 22, 24, 102 surface roughness and deposits a very smooth, high-density and low-defect layer, such as $Si_3N_4$, which consequently permits low gas and moisture permeation.

The coating thickness that is needed to decrease the defect number in order to reach the desired permeability depends mainly on the surface roughness of the chosen polymeric substrate 22, 24, 102. For a variety of different polymers, the required barrier property for LCD devices was achieved with $Si_3N_4$ coating thicknesses varying from about 20 nm up to about 1000 nm.

Other deposition methods may be used to deposit barrier coatings 18, 20, 104 on the surface of respective polymeric substrates 22, 24, 102. These methods include sputtering, evaporation, Ion Beam Assisted deposition (IBAD), high intensity plasma chemical vapor deposition (HIPCVD) using either an inductively coupled plasma (ICP) or electron cyclotron resonance (ECR), combinations thereof, and the like.

Figure 3:
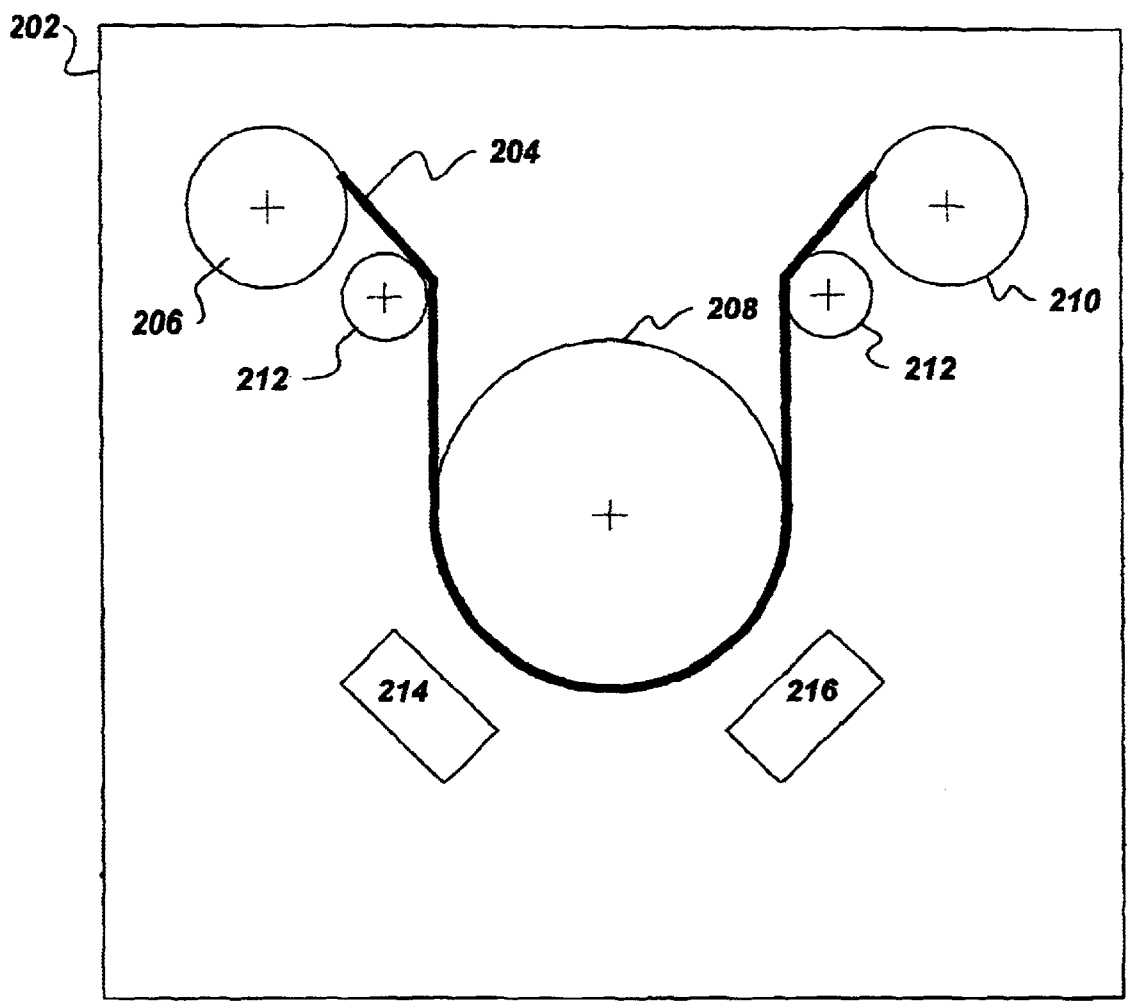
FIG. 3 is a schematic representation of a manufacturing scheme in accordance with one embodiment of the instant invention.

A coating apparatus 200 for depositing a barrier coating on a polymeric substrate in accordance with one embodiment of the instant invention is schematically shown FIG. 3. Coating apparatus 200 is positioned in a vacuum chamber 202. An ultra-smooth dust-free polymeric substrate 204 is mounted on a pay-out reel drum 206. Polymeric substrate 204 is wrapped around a rotatable heated drum 208 and fed to a take-up reel 210. At least two rollers 212 are used, as appropriate, for guiding polymeric substrate 204 from payout-reel drum 206 to take-up reel drum 210, and to control the level of tension applied to polymeric substrate 204. The temperature in rotatable heated drum 208 is controllable and can be maintained at a temperature between room temperature (about 20° C.) and about 500° C.

A first deposition device 214 is used to deposit a barrier-coating layer on polymeric substrate 204 using at least one of PECVD, sputtering, IBAD, evaporation, combinations thereof, or the like. First deposition device is located opposite rotatable heated drum 208, such that a surface of the polymeric substrate 204 faces the first deposition device 214. A second deposition device 216 is located opposite rotatable heated drum 208, such that the surface of the polymeric substrate 204 coated with the barrier-coating layer faces the second deposition device 216. After being coated with the barrier-coating layer, polymeric substrate 204 passes in front of the second deposition device 216 and is coated with a transparent conductor layer (TCL). The transparent conductor layer is deposited by the second deposition device using at least one of PECVD, sputtering, IBAD, evaporation, high intensity plasma chemical vapor deposition (HIPCVD) using either an inductively coupled plasma (ICP) or electron cyclotron resonance (ECR), combinations thereof, or the like. The choice of deposition technique for both barrier layer and TCL layer is based on the material to be deposited, density of the deposited material, and deposition temperature. For example, it is possible to deposit high-density films of $SiO_2$ using PECVD, IBAD, and sputtering at room temperature, whereas deposition of the layer by evaporation must be carried out at higher temperatures in order to obtain the coatings having comparable density.

Vacuum chamber 202 typically contains a vacuum tunnel (not shown) with a differential pumping system (not shown) between first and second deposition devices 214, 216, thereby allowing the pressure within the vacuum chamber to be maintained in the appropriate range for each deposition device 214, 216, as well as to avoid cross-contamination.

The following example serves to illustrate the features and advantages offered by the present invention.

EXAMPLE 1

Silicon nitride ($Si_3N_4$) barrier coatings were deposited on four different types of polymer substrates. Permeation measurements for the oxygen and water vapor transmission rates (OTR and WVTR, respectively) were carried out on a 50 $cm^2$ sample, at 30° C. and 0% relative humidity (RH) for OTR and at 30° C. and 100% RH for WVTR on both coated and uncoated substrates.

Table 1 lists examples of OTR and WVTR obtained for the four different polymer substrates coated with a $Si_3N_4$ layer. In all cases, a very thin $Si_3N_4$ coating (<200 nm thick) is sufficient to obtain the barrier properties of a WVTR of less than 1 $g/m^2$-day and an OTR of less than 0.1 $cm^3/m^2$-day that are necessary for LCD applications.

Coating both sides of PC and PET films with similar coatings was found to improve barrier properties, and the obtained values for OTR and WVTR are lower than the detectability limits of 0.01 cc/m-day and 0.01 $g/m^2$-day, respectively, of the MOCON instruments used for analysis.

The results indicate that the high quality (high-density and very low defect number) thin films deposited by RF plasma according to the present invention produced coated substrates having superior barrier properties.

TABLE 1

Examples of OTR and WVTR for different polymers before and after being coated with silicon nitride using RF plasma.

| Polymer (Thickness in mils) | Coating Thickness (nm) | Uncoated OTR ($cm^3/m^2$-day) | Uncoated WVTR ($g/m^2$-day) | Coated OTR ($cm^3/m^2$-day) | Coated WVTR ($g/m^2$-day) |
|---|---|---|---|---|---|
| Polycarbonate (7) | 190 | 412.50 | 16.70 | 0.055 | 0.150 |
| ULTEM (5) | 160 | 124.30 | 14.50 | 0.045 | 0.073 |
| PET (2) | 170 | 32.50 | 7.70 | 0.028 | 0.086 |
| PEN (2) | 180 | 10.65 | 2.45 | 0.075 | 0.108 |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A flexible liquid crystal display, said flexible liquid crystal display comprising:
   a) two plates, said two plates being substantially parallel to each other, wherein each of said plates comprises: a polymeric substrate, said polymeric substrate having a roughness of up to about 5 nm; a barrier coating disposed on a surface of said polymeric substrate; and a transparent conductive layer disposed on a surface of said barrier coating opposite said polymeric substrate; and
   b) a liquid crystal material, said liquid crystal material being disposed between said two plates, such that said liquid crystal material contacts said transparent conductive layer on each of said two plates.

2. The flexible liquid crystal display of claim 1, wherein each of said plates has an oxygen permeation rate of no greater than about 0.1 $cm^3/m^2$-day.

3. The flexible liquid crystal display of claim 2, wherein each of said plates has a water vapor transmission rate of no greater than about 1.0 $g/m^2$-day.

4. The flexible liquid crystal display of claim 1, wherein said polymeric substrate is a polycarbonate substrate.

5. The flexible liquid crystal display of claim 1, wherein said liquid crystal material is a liquid crystal material selected from the group consisting of nematic liquid crystals, thermochromic liquid crystals, liotropic liquid crystals, ferroelectric liquid crystals, twisted nematic liquid crystals, super twisted nematic liquid crystals, and polymer-dispersed liquid crystals.

6. The flexible liquid crystal display of claim 1, wherein said polymeric substrate has a glass transition temperature of at least about 150° C.

7. The flexible liquid crystal display of claim 6, wherein said polymeric substrate has a glass transition temperature of at least about 250° C.

8. The flexible liquid crystal display of claim 1, wherein said polymeric substrate has a thickness of between about 12 microns and about 3 mm.

9. The flexible liquid crystal display of claim 1, wherein said polymeric substrate is formed under class 1000 clean room conditions.

10. The flexible liquid crystal display of claim 1, wherein said barrier coating is deposited by a technique selected from the group consisting of plasma enhanced chemical vapor deposition, ion beam assisted deposition, sputtering, thermal evaporation, electron beam evaporation, high intensity plasma chemical vapor deposition, and combinations thereof.

11. The flexible liquid crystal display of claim 1, wherein said barrier coating has a density of at least 1.8 $g/cm^3$.

12. The flexible liquid crystal display of claim 1, wherein said barrier coating comprises at least one compound selected from the group consisting of silicon nitride, silicon oxide, aluminum oxide, and combinations thereof.

13. The flexible liquid crystal display of claim 12, wherein said barrier coating comprises silicon nitride.

14. The flexible liquid crystal display of claim 12, wherein said barrier coating comprises silicon oxide.

15. The flexible liquid crystal display of claim 1, wherein said barrier coating has a thickness of between about 10 nm and about 1000 nm.

16. The flexible liquid crystal display of claim 1, wherein said transparent conductive layer has a sheet resistance of up to about 30 Ω per square.

17. The flexible liquid crystal display of claim 1, wherein said transparent conductive layer comprises an oxide of at least one metal selected from the group consisting of tin, cadmium, indium, zinc, magnesium, gallium, and combinations thereof.

18. The flexible liquid crystal display of claim 17, wherein said transparent conductive layer further comprises at least one dopant selected from the group consisting of gallium, aluminum, germanium, and tin.

19. The flexible liquid crystal display of claim 17, wherein said oxide is indium tin oxide.

20. The flexible liquid crystal display of claim 1, wherein said transparent conductive layer comprises at least one metal selected from the group consisting of aluminum, copper, platinum, palladium, and alloys thereof.

21. The flexible liquid crystal display of claim 1, wherein said transparent conductive layer has a thickness of between about 20 nm and about 200 nm.

22. A flexible liquid crystal display, said flexible liquid crystal display comprising:
   a) two plates, said two plates being substantially parallel to each other, wherein each of said plates comprises: a polycarbonate substrate, said polycarbonate substrate having a roughness of up to about 5 nm; a barrier coating disposed on a surface of said polycarbonate substrate; and a transparent conductive layer disposed on a surface of said barrier coating opposite said polycarbonate substrate; and
   b) a liquid crystal material, said liquid crystal material being disposed between said two plates, such that said liquid crystal material contacts said transparent conductive layer on each of said two plates,
   wherein each of said plates has an oxygen permeation rate of no greater than about 0.1 $cm^3/m^2$-day and a water vapor transmission rate of no greater than about 1.0 $g/m^2$-day.

23. The flexible liquid crystal display of claim 22, wherein said liquid crystal material is a liquid crystal material selected from the group consisting of nematic liquid crystals, thermochromic liquid crystals, liotropic liquid crystals, ferroelectric liquid crystals, twisted nematic liquid crystals, super twisted nematic liquid crystals, and polymer-dispersed liquid crystals.

24. The flexible liquid crystal display of claim 22, wherein said polycarbonate substrate has a glass transition temperature of at least about 150° C.

25. The flexible liquid crystal display of claim 22, wherein said polycarbonate substrate has a glass transition temperature of at least about 250° C.

26. The flexible liquid crystal display of claim 22, wherein said polycarbonate substrate has a thickness of between about 12 microns and about 3 mm.

27. The flexible liquid crystal display of claim 22 wherein said polycarbonate substrate is formed under class 1000 clean room conditions.

28. The flexible liquid crystal display of claim 22, wherein said barrier coating is deposited by a technique selected from the group consisting of plasma enhanced chemical vapor deposition, ion beam assisted deposition, sputtering, thermal evaporation, electron beam evaporation, high intensity plasma chemical vapor deposition, and combinations thereof.

29. The flexible liquid crystal display of claim 22, wherein said barrier coating comprises at least one compound selected from the group consisting of silicon nitride, silicon oxide, aluminum oxide, and combinations thereof.

30. The flexible liquid crystal display of claim 29, wherein said barrier coating comprises silicon nitride.

31. The flexible liquid crystal display of claim 29, wherein said barrier coating comprises silicon oxide.

32. The flexible liquid crystal display of claim 1, wherein said barrier coating has a thickness of between about 10 nm and about 1000 nm.

33. The flexible liquid crystal display of claim 22, wherein said transparent conductive layer has a sheet resistance of up to about 30 Ω per square.

34. The flexible liquid crystal display of claim 22, wherein said transparent conductive layer comprises an oxide of at least one metal selected from the group consisting of tin, cadmium, indium, zinc, magnesium, gallium, and combinations thereof.

35. The flexible liquid crystal display of claim 34, wherein said oxide is indium tin oxide.

36. The flexible liquid crystal display of claim 34, wherein said transparent conductive layer further comprises at least one dopant selected from the group consisting of gallium, aluminum, germanium, and tin.

37. The flexible liquid crystal display of claim 22, wherein said transparent conductive layer comprises at least one metal selected from the group consisting of aluminum, copper, platinum, palladium, and alloys thereof.

38. The flexible liquid crystal display of claim 22, wherein said transparent conductive layer has a thickness of between about 20 nm and about 200 nm.

39. The flexible liquid crystal display of claim 22, wherein said transparent conductive layer is deposited by a technique selected from the group consisting of plasma enhanced chemical vapor deposition, ion beam assisted deposition, sputtering, thermal evaporation, electron beam evaporation, high intensity plasma chemical vapor deposition, and combinations thereof.

* * * * *